(12) United States Patent
Mizukami et al.

(10) Patent No.: US 6,883,628 B1
(45) Date of Patent: Apr. 26, 2005

(54) ARRANGEMENT OF ELECTRICAL EQUIPMENTS IN MOTOR VEHICLE

(75) Inventors: Kouichi Mizukami, Okazaki (JP); Koji Tamakoshi, Toyota (JP); Koji Makino, Nishikamo-gun (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/669,771

(22) Filed: Sep. 26, 2000

(30) Foreign Application Priority Data

Oct. 19, 1999 (JP) ................................ 11-296179
Jul. 21, 2000 (JP) .............................. 2000-220328

(51) Int. Cl.$^7$ ............................................. B60K 37/00
(52) U.S. Cl. ...................... 180/90; 180/291; 296/192
(58) Field of Search .............................. 180/69.4, 89.1, 180/90, 291; 296/192

(56) References Cited

U.S. PATENT DOCUMENTS

| | | | |
|---|---|---|---|
| 4,410,226 A | * | 10/1983 | Adduci et al. |
| 4,698,562 A | * | 10/1987 | Gale et al. .................... 318/254 |
| 4,795,958 A | * | 1/1989 | Nakamura et al. .......... 318/625 |
| 4,909,566 A | * | 3/1990 | Hashimoto et al. ......... 296/192 |
| 4,988,144 A | * | 1/1991 | Johnson et al. ............. 296/192 |
| 5,502,615 A | * | 3/1996 | Kubota et al. ............... 361/647 |
| 5,663,866 A | * | 9/1997 | Ichikawa et al. ........... 361/643 |
| 5,785,532 A | * | 7/1998 | Maue et al. .................... 439/34 |
| 5,833,578 A | * | 11/1998 | Potis ........................... 477/165 |
| 5,903,444 A | * | 5/1999 | Sekido et al. ............... 361/819 |
| 5,988,119 A | * | 11/1999 | Trublowski et al. ...... 123/41.31 |
| 6,044,923 A | * | 4/2000 | Reagan et al. .............. 180/65.4 |
| 6,119,060 A | * | 9/2000 | Takayama et al. ............ 701/36 |

FOREIGN PATENT DOCUMENTS

| | | |
|---|---|---|
| DE | 36 19 183 C2 | 12/1987 |
| DE | 37 32 087 C1 | 12/1988 |
| EP | 0 857 618 | 8/1998 |
| JP | (P) HEI 1-30856) | 7/1987 |
| JP | (P) SHO 64-30856 | 7/1987 |
| JP | A 63-931 | 1/1988 |
| JP | A 7-101295 | 4/1995 |
| JP | (P) HEI 9-180807 | 7/1997 |
| JP | A 10-255901 | 9/1998 |
| JP | A 2000-225901 | 8/2000 |
| WO | WO 94/19213 | 9/1994 |

OTHER PUBLICATIONS

Ford Taurus & Mercury Sable, Haynes Repair Manual.*
Subaru Legacy, Automotive Repair Manual.*

* cited by examiner

*Primary Examiner*—Christopher P. Ellis
*Assistant Examiner*—Christopher Bottorff
(74) *Attorney, Agent, or Firm*—Kenyon & Kenyon

(57) ABSTRACT

A structure in which a plurality of electrical equipments are arranged in a motor vehicle is provided in which electrical equipments, such as an engine control computer, a relay block, a junction box, an ABS actuator, and a meter unit, which were conventionally arranged apart from each other in an engine room and cabin of the vehicle, are concentrated in a generally central region of the vehicle as viewed in the vehicle width direction, namely, on a centerline that extends in a longitudinal direction of the vehicle body and in the vicinity thereof.

7 Claims, 7 Drawing Sheets

*PRIOR ART*

ARRANGEMENT OF ELECTRICAL EQUIPMENTS IN MOTOR VEHICLE

INCORPORATION BY REFERENCE

The disclosures of Japanese Patent Applications No. 11-296179 filed on Oct. 19, 1999 and No. 2000-220328 filed on Jul. 21, 2000 including the specification, drawings and abstract are incorporated herein by reference in their entirety for purposes of claiming priority thereto.

BACKGROUND OF THE INVENTION

1. Field of the Invention

The present invention relates to a structure in which electrical equipments are arranged in a motor vehicle, and, more particularly, to a structure in which electrical equipments are arranged or placed in an engine room and a front part of a cabin in an automobile.

2. Description of Related Art

Japanese Laid-open Patent Publication No. SHO 64-30856 discloses a known example of the structure in which electrical equipments are arranged in an engine room and a front part of a cabin in an automobile.

In the arrangement of electrical equipments as disclosed in the above-indicated publication and shown in FIG. 7, a joint box 70 is mounted on an upper portion of a dash-board 76 located between a cabin 72 and an engine room 74. In the engine room 74, its wire harness 78 is collectively disposed or concentrated in a relay box 70A of the joint box 70. In the cabin 72, its wire harness 80 is collectively disposed or concentrated in a waiting connector 70B in the joint box 70.

In the structure for arrangement of electrical equipments shown in FIG. 7, however, electrical equipments, such as an ECU (including an engine control unit and an electronically controlled fuel injector) and a relay block, are dispersedly arranged at separate positions in the engine room 74. Consequently, the length of the wire harness extending from each of the electrical equipments to the joint box 70 tends to be increased.

SUMMARY OF THE INVENTION

The present invention was developed in the light of the aforementioned circumstances. It is therefore an object of the present invention to provide a structure in which electrical equipments are arranged such that the length of wire harnesses can be reduced.

To accomplish the above object, the present invention provides a structure in which a plurality of electrical equipments are arranged in a motor vehicle, comprising: at least two electrical equipments selected from an engine control computer, a relay block, a junction box, an ABS actuator, and a meter unit; and a vehicle body that defines a space including a generally central region as viewed in a direction of the width of the vehicle, wherein the above-indicated at least two electrical equipments are concentrated in said generally central region of the space defined by the vehicle body.

With the above-described arrangement of electrical equipments, the length of each of wire harnesses that lead to the respective electrical equipments, which length is measured in the lateral direction of the vehicle body, can be reduced as compared with that in a known structure in which the electrical equipments are dispersedly arranged or somewhat remotely located in the engine room and the cabin as viewed in the vehicle width direction. Consequently, the length of each wire harness can be reduced, and the weight of the vehicle body can be thus reduced.

In one preferred form of the present invention, the vehicle body includes a partition wall that separates an engine room and a cabin from each other, and the relay block and the junction box are concentrated in the generally central region as viewed in the vehicle width direction, to be located in the vicinity of the partition wall.

With the arrangement of the electrical components as described above, the length of wires between the relay block and the junction box can be reduced as compared with that in conventional structures.

In the above form of the present invention, the vehicle body may include a cowl formed therein, and at least one of the relay block and the junction box may be located in the cowl.

With the arrangement described just above, the length of the wires between corresponding ones of the electrical equipments can be reduced as compared with that in conventional structures.

In another preferred form of the present invention, the engine control computer is located in a generally central region of the engine room as viewed in the vehicle width direction.

Although the engine control computer was conventionally located apart from other equipments, the engine control computer in the above-described structure is located in the substantially central region of the engine room as viewed in the vehicle width direction. With this arrangement, the length of the wires between corresponding ones of the engine control computer, relay block and the junction box can be reduced as compared with that in conventional structures.

In a further preferred form of the present invention, the vehicle body includes a dash cross member that substantially extends in the vehicle width direction, and the ABS actuator is located on a generally central portion of the dash cross member as viewed in the vehicle width direction.

Although the ABS actuator was conventionally located apart from other equipments, the ABS actuator in the structure described just above is located on a substantially central portion of the dash cross member as viewed in the vehicle width direction. With this arrangement, the length of wires between the ABS actuator, and the relay block and junction box, can be reduced as compared with that in known structures. Also, the length of wires or lines between the ABS actuator and the wheel cylinders can also be reduced. Consequently, the weight of the vehicle body can be further reduced.

In another preferred form of the present invention, the meter unit is located in a generally central region of the cabin as viewed in the vehicle width direction.

Although the meter unit was conventionally located apart from other components, the meter unit in the aforementioned structure is located in a generally central region of the cabin as viewed in the vehicle width direction. With this arrangement, the length of wires between corresponding ones of the meter unit, the relay block and the junction box can be reduced as compared with that in conventional structures.

In a still another preferred form of the present invention, the generally central region of the space defined by the vehicle body comprises a first region that is closer in the vehicle width direction to a centerline of the vehicle that extends in a longitudinal direction thereof, than a position at which a brake booster is located, and a second region that is symmetrical with the first region with respect to the centerline of the vehicle.

In the structure as described above, the electrical equipments are arranged in a region as a combination of a first region that is closer in the vehicle width direction to a centerline of the vehicle that extends in a longitudinal direction thereof, than a position at which a brake booster is located, and a second region that is symmetrical with the first region with respect to the centerline of the vehicle. With this arrangement, the length of wires between corresponding ones of the electrical equipments can be reduced.

DETAILED DESCRIPTION OF PREFERRED EMBODIMENTS

A structure in which electrical equipments are arranged in an automobile according to the first embodiment of the present invention will be described in detail with reference to FIGS. 1 through 3. In these figures, arrow FR denotes the vehicle forward direction, and arrow UP denotes the vehicle upward direction.

Figure 3:
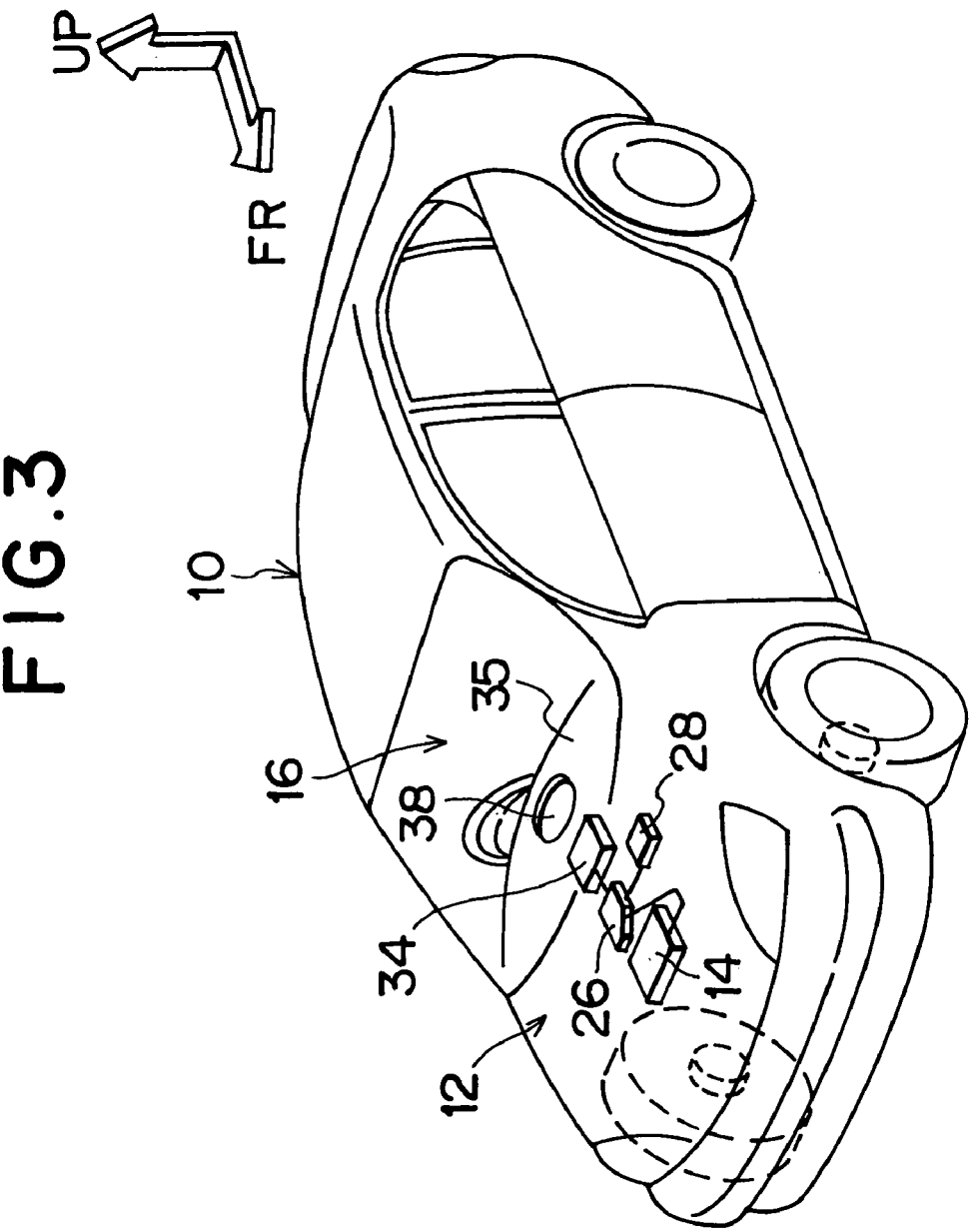
FIG. 3 is a schematic perspective view of a vehicle body in which the electrical equipments are arranged in place according to the first embodiment of the present invention, when the vehicle body is viewed from the front of the vehicle away from the centerline that extends in the running direction of the vehicle.

In the arrangement of the electrical equipments of the first embodiment, an ECU 14 (or an engine control computer) is placed in an engine room 12 of a vehicle body 10 of the automobile, as shown in FIG. 3.

Figure 1:
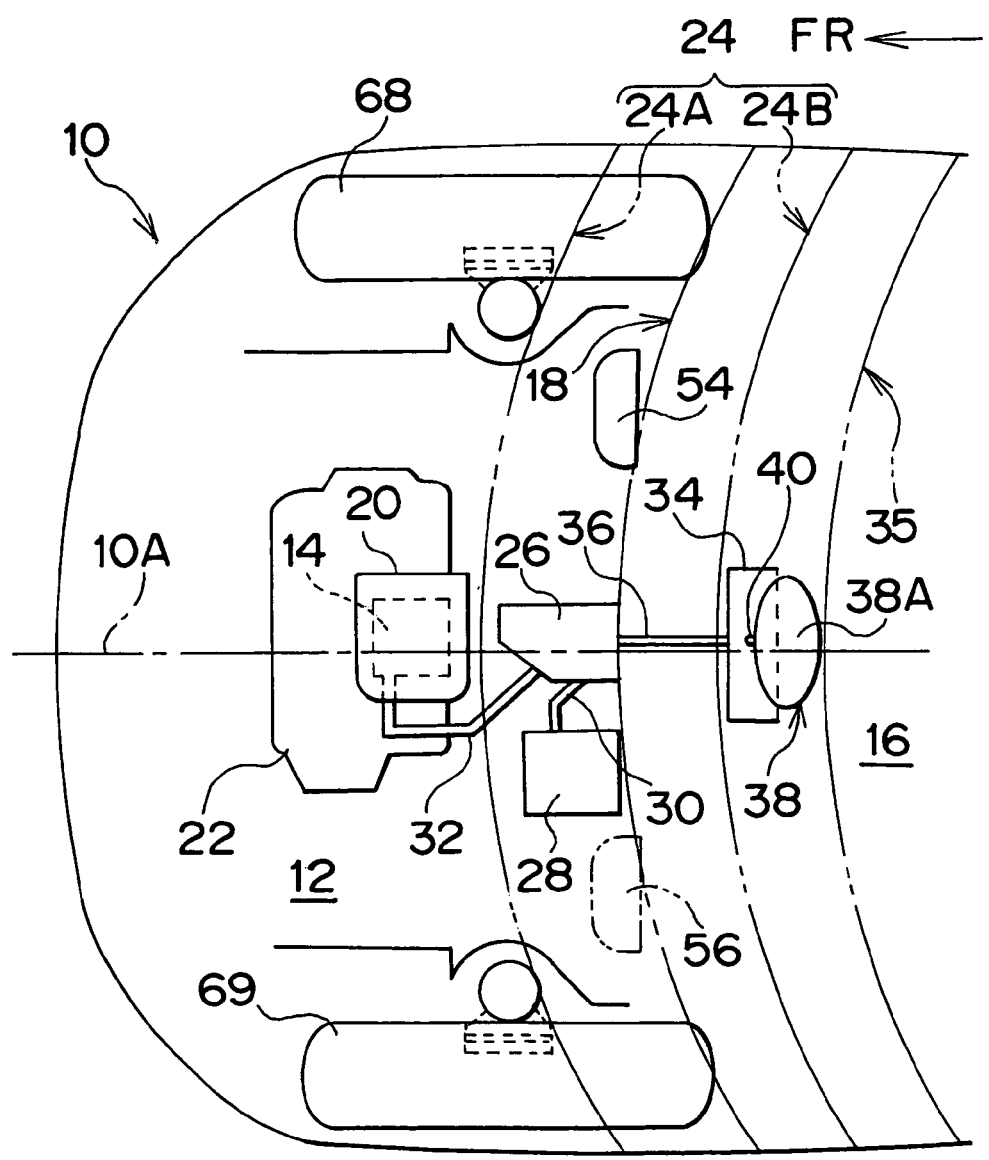
FIG. 1 is a schematic plan view showing a structure in which electrical equipments are arranged according to the first embodiment of the present invention.

Referring to FIG. 1, the ECU 14 is positioned in a substantially central region as viewed in a vehicle width direction in the vicinity of an upper portion of a dash panel 18 that provides a partition between the engine room 12 and the cabin 16. Namely, the ECU 14 is located on or in the vicinity of a centerline 10A that extends in the longitudinal direction of the vehicle body 10. For example, the ECU 14 is disposed in a combination of a first region that is closer to the center of the vehicle body as viewed in the vehicle width direction than the position of a brake booster 54 and a second region that is symmetrical with the first region with respect to the centerline 10A as viewed in the vehicle width direction (i.e., a region between the position of the brake booster 54 for a right-hand drive vehicle and the position of a brake booster 56 for a left-hand drive vehicle). The ECU 14 is located in an air cleaner 20 that is secured to an upper portion of an engine 22 disposed substantially in the middle of the engine room 12. The ECU 14 can be protected from heat, dust, and the like, thus eliminating a need to separately provide a case for the air cleaner only.

Figure 2:
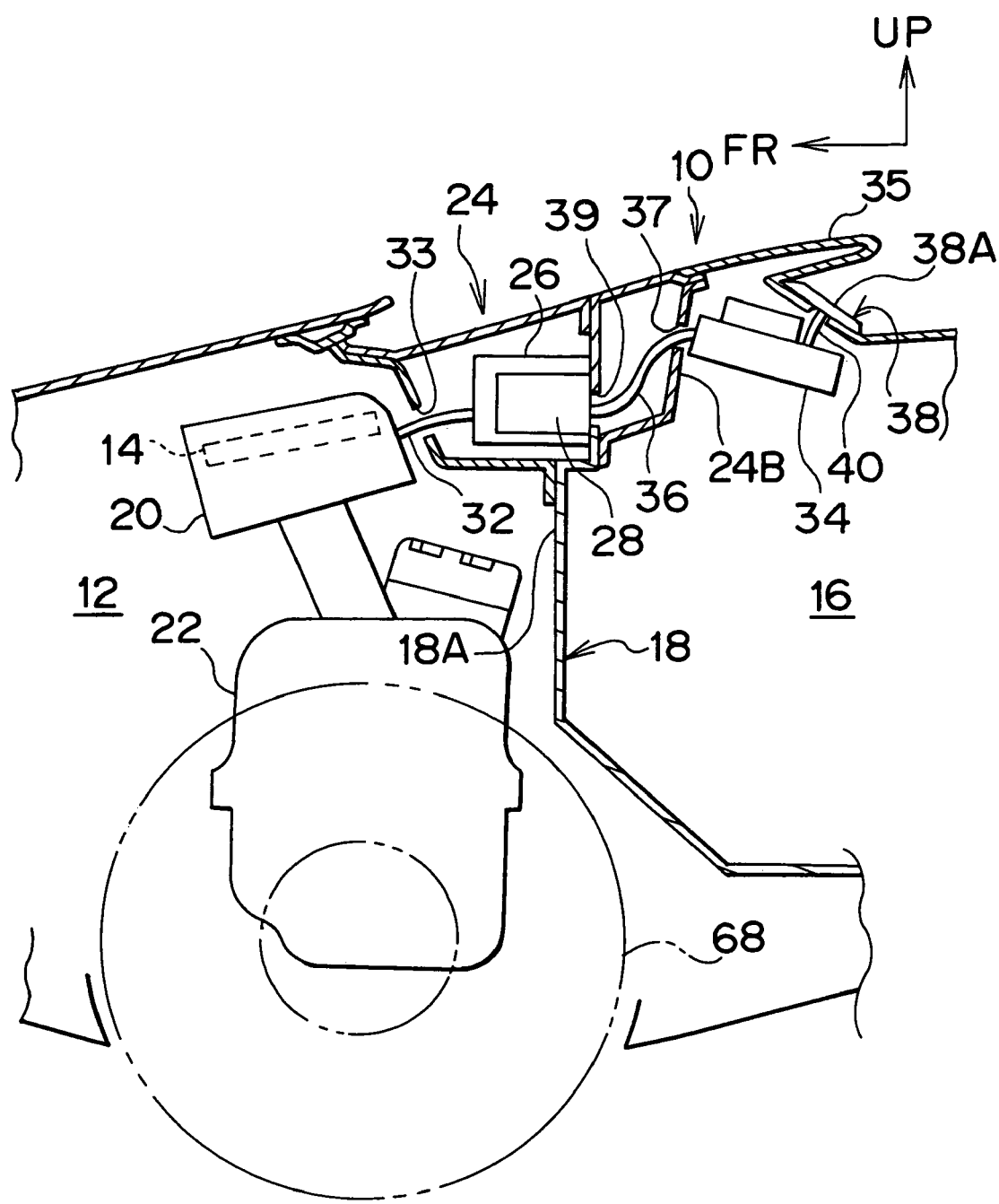
FIG. 2 is a schematic lateral cross-sectional view showing a structure in which electrical equipments are arranged according to the first embodiment of the present invention.

Referring now to FIG. 2, a relay block 26 and an ABS actuator 28 are located inside a cowl 24 that is formed in an upper portion of a dash panel 18.

As shown in FIG. 1, the relay block 26 and the ABS actuator 28 are located in a substantially central region as viewed in the vehicle width direction. The relay block 26 and the ABS actuator 28 are connected to each other by a harness 30.

As shown in FIG. 2, the relay block 26 and the ECU 14 are connected to each other by a harness 32, which is passed through a through-hole 33 formed in a front wall portion 24A of the cowl 24. A junction box 34 is disposed in the cabin 16. The junction box 34 is located behind and close to the cowl 24, and also located inside an instrument panel 35.

As shown in FIG. 1, the junction box 34 is located in a substantially central region as viewed in the vehicle width direction. The junction box 34 and the relay block 26 are connected to each other by a harness 36.

As shown in FIG. 2, the harness 36 is passed through a through-hole 37 formed in a rear wall portion 24B of the cowl 24 and a through-hole 39 formed in an upper portion of the dash panel 18. A meter unit 38 is located in the cabin 16. The meter unit 38 is fixed to the instrument panel 35, and has a display portion 38A that is visible from the interior of the cabin 16.

As shown in FIG. 1, the meter unit 38 is located in a substantially central region as viewed in the vehicle width direction. The meter unit 38 and the junction box 34 are connected to each other by a harness 40. In FIG. 1, reference numerals 68, 69 denote right-hand side and left-hand side front wheels, respectively.

Next, the advantages of the first embodiment will be described.

In the first embodiment, electrical equipments conventionally arranged dispersedly in the engine room 12 and electrical equipments conventionally arranged dispersedly along the vehicle width direction in the vicinity of the dash panel 18 in the cabin 16, namely, the ECU 14, the relay block 26, the ABS actuator 28, the junction box 34 and the meter unit 38, are arranged in the substantially central region as viewed in the vehicle width direction, in the vicinity of the dash panel 18 that serves as a partition between the engine room 12 and the cabin 16 (i.e., a portion that lies on and in the vicinity of the centerline 10A that extends in the longitudinal direction of the vehicle body 10).

The above arrangement makes it possible to reduce the length of each of the wire harnesses 30, 32, 36 and 40 leading to the ECU 14, the relay block 26, the ABS actuator 28, the junction box 34 and the meter unit 38, as measured in the longitudinal and lateral directions of the vehicle body, as compared with conventional wire harnesses. Thus, the length and weight of the wire harnesses 30, 32, 36 and 40 can be advantageously reduced.

In the first embodiment, the ECU 14, the relay block 26, the ABS actuator 28, the junction box 34 and the meter unit 38 are arranged in the substantially central region as viewed in the vehicle width direction. With this arrangement, the ECU 14, the relay block 26, the ABS actuator 28, the junction box 34 and the meter unit 38 can be arranged at the same positions in both a right-hand drive vehicle and a left-hand drive vehicle. Therefore, the wire harnesses 30, 32, 36 and 40 can be commonly used.

In the first embodiment, the ECU 14, the relay block 26, the ABS actuator 28, the junction box 34 and the meter unit 38 are arranged in the substantially central region as viewed in the vehicle width direction. Thus, these electrical equipments hardly prevent installation of components such as a steering pedal and an air-conditioner.

In the first embodiment, the through-holes 33, 37 and 39 through which the respective harnesses are passed can be formed in the substantially central regions of the dash panel 18 and the cowl 24 as viewed in the vehicle width direction. In order to commonly use the dash panel and the cowl in right-hand drive vehicles and left-hand drive vehicles, two through-holes through which the wire harnesses are passed were conventionally formed in the left and right upper portions of each of the cowl and the dash panel. In the first embodiment, however, the through-holes are concentrated at one location, thus eliminating through-holes that are not in use.

Figure 4:
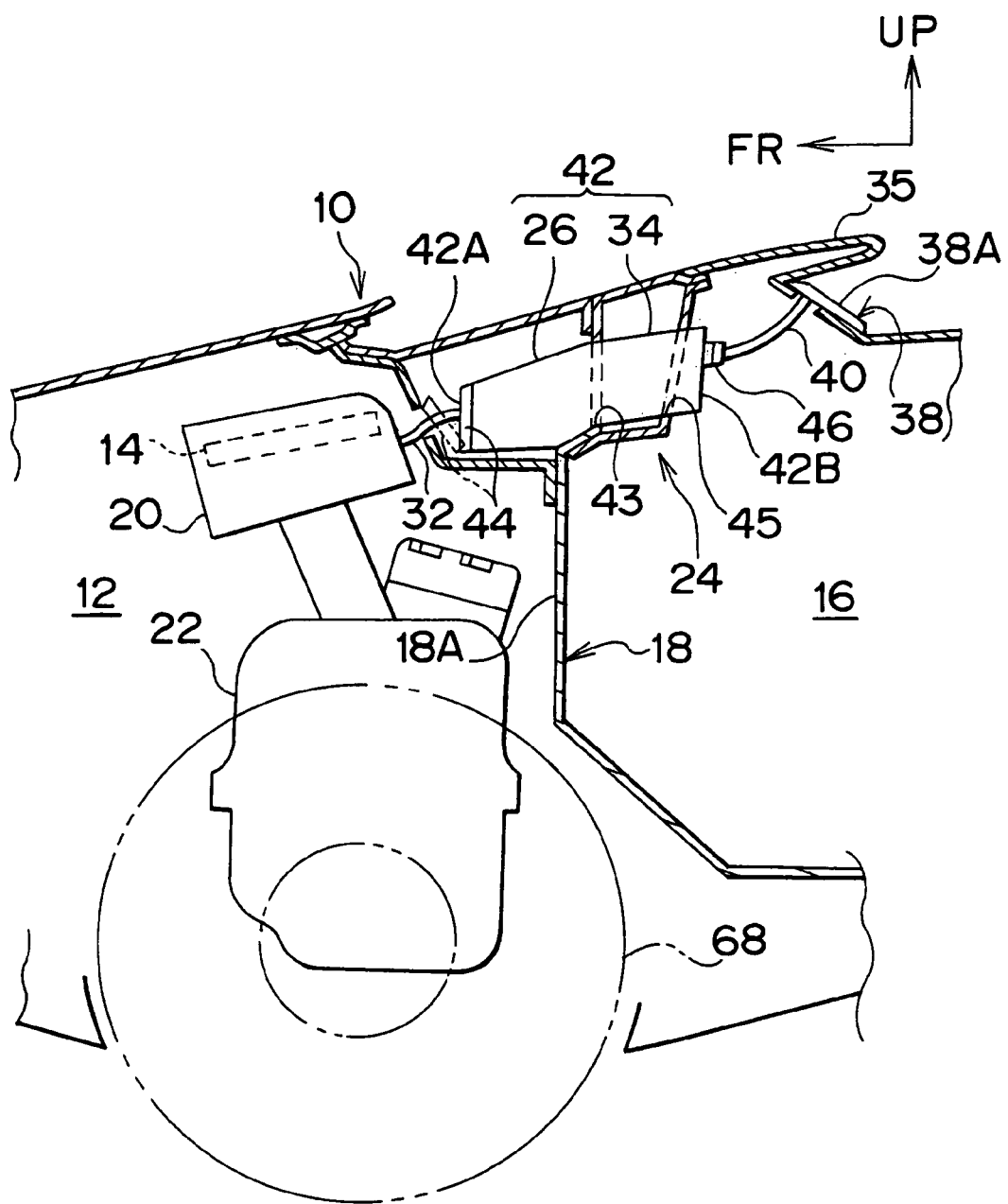
FIG. 4 is a schematic lateral cross-sectional view showing a structure in which the electrical equipments are arranged according to the second embodiment of the present invention.

A structure in which electrical equipments are arranged according to the second embodiment of the present invention will be described with reference to FIG. 4. In FIG. 4, the same reference numerals as used in FIG. 1 to FIG. 3 with respect to the first embodiment are used for identifying corresponding elements or components, of which no detailed description will be provided.

In the second embodiment as shown in FIG. 4, the relay block 26 and the junction box 34 are integrated to provide an integral relay-junction box 42. In a central region as viewed in the vehicle width direction, the relay-junction box 42 extends from the engine room 12 through the cowl 24 to the inside of the instrument panel 35. The dash panel 18 and the cowl 24 have holes 43, 45, respectively, through which the relay-junction box 42 is passed. Clearances between the holes 43, 45 and an outer peripheral portion of the relay-junction box 42 are sealed so that leakage of water can be prevented. A door 44 is provided at a front wall portion 42A of the relay-junction box 42. When the door 44 is placed in an open position as indicated by a two-dot chain line in FIG. 4, it is easy to replace fuses and other components. A connector 46 is disposed on a rear wall portion 42B of the relay-junction box 42 so that connector coupling can easily be conducted on the side of the cabin 16.

Next, the advantages of the second embodiment will be described, which are provided in addition to those of the first embodiment.

In the second embodiment in which the relay block 26 and the junction block 34 are integrated to provide the relay-junction box 42, the weight of the relay-junction box 42 can be made smaller than the total weight of the relay block 26 and the junction block 34 when they are provided separately. Consequently, the weight of the vehicle body can be further reduced. Also, the space required for the relay-junction box 42 is smaller than the space required for the relay block 26 and the junction block 34 when they are provided separately. Thus, the relay-junction box 42 requires reduced space. It is also possible to eliminate the wire harness 36 used in the first embodiment for connecting the relay block 26 with the junction block 34.

Figure 5:
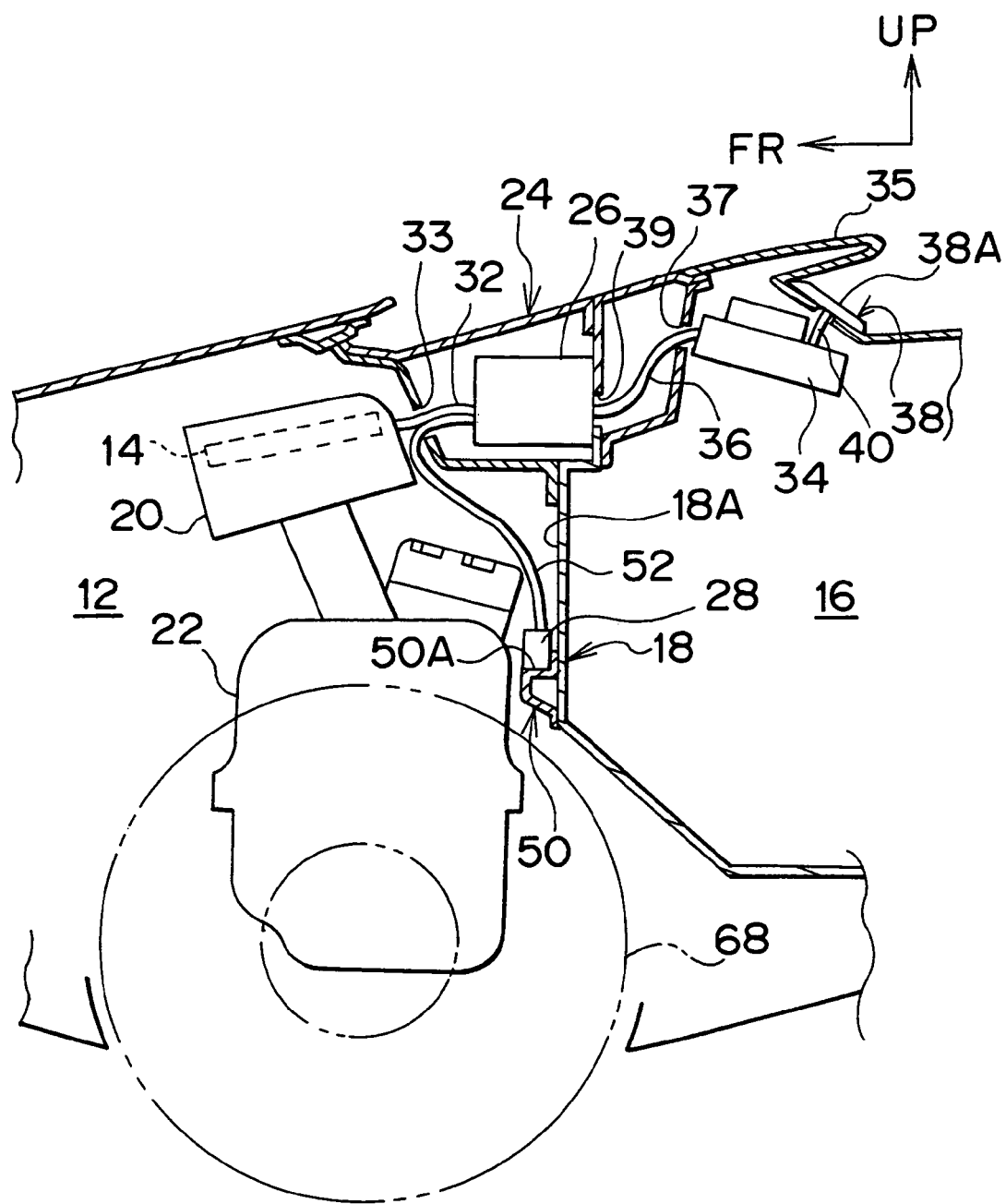
FIG. 5 is a schematic lateral cross-sectional view showing a structure in which the electrical equipments are arranged according to the third embodiment of the present invention.
Figure 6:
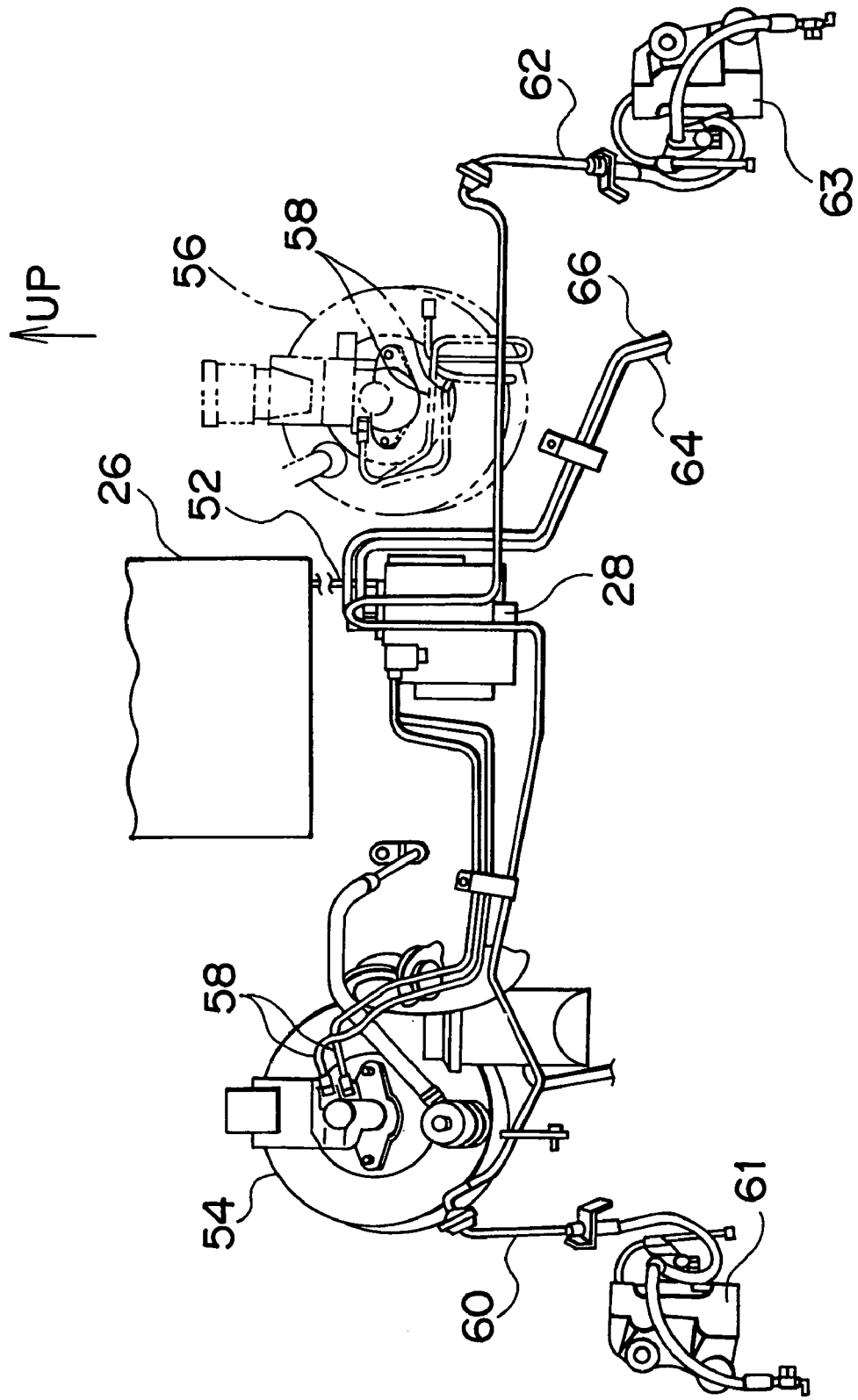
FIG. 6 is a schematic front view showing ABS brake lines in the structure in which the electrical compoenets are arranged according to the third embodiment of the present invention.
Figure 7:
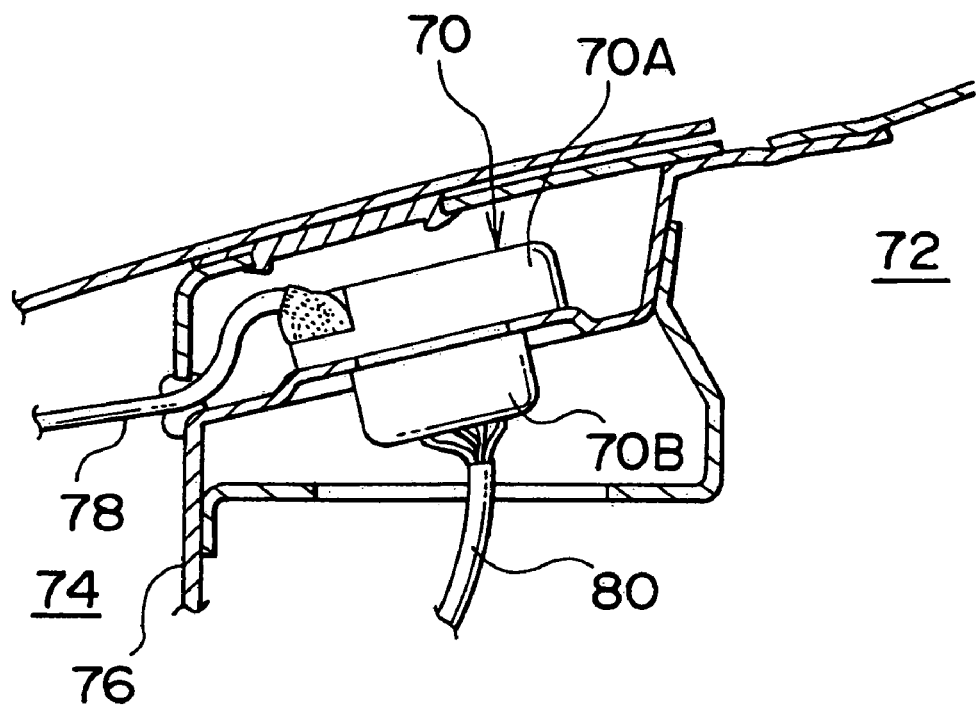
FIG. 7 is a lateral cross-sectional view showing a known example of arrangement of electrical equipments in a motor vehicle.

A structure in which electrical equipments are arranged according to the third embodiment of the present invention will be described with reference to FIGS. 5 and 6. In FIGS. 5 and 6, the same reference numerals as used in FIG. 1 to FIG. 3 with respect to the first embodiment are used for identifying corresponding elements or components, of which no detailed description will be provided.

In the third embodiment as shown in FIG. 5, the ABS actuator 28 is disposed on an upper wall portion 50A of a dash cross member 50 in a central region as viewed in the vehicle width direction. In a lower portion in the engine room 12, the dash cross member 50 is welded to a front wall portion 18A of the dash panel 18 so as to extend in the vehicle width direction. Although not shown, the dash cross member 50 is hung at its opposite ends upon left and right front side members. The ABS actuator 28 is connected to the relay block 26 by a harness 52.

As shown in FIG. 6, the ABS actuator 28 is connected to the booster 54 for a right-hand drive vehicle as indicated by a solid line in FIG. 6 or to the booster 56 for a left-hand drive vehicle as indicated by a two-dot chain line in FIG. 6, by hydraulic lines 58. The ABS actuator 28 is connected to a right-front wheel cylinder 61 by a right-front wheel brake line 60, and to a left-front wheel cylinder 63 by a left-front wheel brake line 62. The ABS actuator 28 is connected to left and right rear wheel cylinders (not shown) by a left-rear wheel brake line 66 and a right-rear wheel brake line 64, respectively.

Next, the advantages of the third embodiment will be described which are provided in addition to those of the first embodiment.

In the third embodiment, the ABS actuator 28 is located in the lower portion of the engine room 12 and also on the upper wall portion 50A of the dash cross member 50 in the central region as viewed in the vehicle width direction. With this arrangement, the ABS actuator 28, the right-front wheel cylinder 61, the left-front wheel cylinder 63 and the left-rear and right-rear wheel cylinders are located closer to each other, as compared with the case where the ABS actuator 28 is located inside the cowl 24.

As a result, the length of each of the right-front wheel brake line 60, the left-front wheel brake line 62, the right-rear wheel brake line 64 and the left-rear wheel brake line 66 can be reduced, and therefore the weight of the vehicle body can be further reduced. Also, the right-front brake line 60, the left-front wheel brake line 62, the right-rear brake line 64 and the left-rear brake line 66 can commonly be used for both a right-hand drive vehicle and a left-hand drive vehicle.

Although some embodiments of the present invention have been described hitherto in detail, the present invention is not limited to those embodiments. It is obvious to those skilled in the art that a variety of other embodiments are possible within the scope of the present invention. In the second embodiment, the integral relay-junction box 42 extends from the engine room 12 through the cowl 24 until it reaches the inside of the instrument panel 35. Instead, the integral relay-junction box 42 may extend from the inside of the cowl 24 to the inside of the instrument panel 35. Also, the junction block 34 and the meter unit 38 may be integrated as a unit, or the relay block 26, the junction block 34 and the meter unit 38 may be integrated as a unit.

In the third embodiment, the ABS actuator 28 is located on the upper wall portion 50A of the dash cross member 50 in the central region as viewed in the vehicle width direction. It is, however, possible to locate the ABS actuator 28 on the front wall portion, the rear wall portion or the lower wall portion of the dash cross member 50 in the central region in the vehicle width direction.

What is claimed is:

1. A structure in which a plurality of electrical equipments are arranged in a motor vehicle, comprising:

an engine control computer, a relay block, a junction box, a meter unit, and an ABS actuator;

a brake booster which is located at one of a right half region and a left half region of the vehicle; and a vehicle body with a longitudinal centerline that defines a space including a generally centralized region as viewed in a direction of the width of the vehicle, said region extending symmetrically from both sides of the centerline for a distance which is no more than one-half the distance, measured in a direction normal to the centerline, between the centerline and a longitudinal axis of the brake booster disposed within the vehicle body;

wherein the engine control computer, relay block, junction box, and ABS actuator are concentrated in said generally central region of the space defined by the vehicle body, and the locations of the engine control computer, the relay block, the junction box and the ABS actuator are the same when the vehicle is a right-hand drive vehicle as when the vehicle is a left-hand drive vehicle;

wherein said vehicle body includes a partition wall that separates an engine room and a cabin from each other, the engine control computer, the relay block and the ABS actuator are located on an engine-room side of the partition wall, the meter unit and the junction box are located in a generally central region of the cabin as viewed in a vehicle width direction, the vehicle body includes a dash cross member that substantially extends in the vehicle width direction, the ABS actuator is located on a generally central portion of the dash cross member as viewed in the vehicle width direction, each of the engine control computer, the relay block, the junction box, the meter unit and the ABS actuator are connected via one of a plurality of harnesses, some of the harnesses pass through holes formed in a generally central portion of the partition wall, the engine control computer, the relay block, the junction box, and the meter unit are located at a substantially same height in a vehicle height direction, and the engine control computer, the relay block, the junction box, and the meter unit are sequentially aligned substantially along the longitudinal centerline.

2. The structure of claim 1, wherein the relay block and the junction box are concentrated in said generally central region as viewed in the vehicle width direction, to be located in the vicinity of the partition wall.

3. The structure as defined in claim 2, wherein said vehicle body includes a cowl formed therein, and wherein at least one of the relay block and the junction box is located in the cowl.

4. The structure as defined in claim 2, wherein the relay block and the junction box are formed as an integral assembly.

5. The structure as defined in claim 4, wherein said vehicle body includes a cowl formed therein, and wherein at least a part of the integral assembly of the relay block and the junction box is located in the cowl.

6. The structure as defined in claim 1, wherein the engine control computer is located in a generally central region of the engine room as viewed in the vehicle width direction.

7. A structure in which a plurality of electrical equipments are arranged in a motor vehicle, comprising:

an engine control computer, a relay block, a junction box, a meter unit, and an ABS actuator; and a vehicle body with a longitudinal centerline that defines a space including a generally centralized region as viewed in a direction of the width of the vehicle, said region extending symmetrically about the centerline and having a total width of one-half of the vehicle width, wherein the engine control computer, relay block, junction box, and ABS actuator are concentrated in said generally central region of the space defined by the vehicle body, wherein said vehicle body includes a partition wall that separates an engine room and a cabin from each other, the engine control computer, the relay block and the ABS actuator are located on an engine-room side of the partition wall, the meter unit and the junction box are located in a generally central region of the cabin as viewed in a vehicle width direction, the vehicle body includes a dash cross member that substantially extends in the vehicle width direction, the ABS actuator is located on a generally central portion of the dash cross member as viewed in the vehicle width direction, each of the engine control computer, the relay block, the junction box, the meter unit and the ABS actuator are connected via one of a plurality of harnesses, some of the harnesses pass through holes formed in a generally central portion of the partition wall, the engine control computer, the relay block, the junction box, and the meter unit are located at a substantially same height in a vehicle height direction, and the engine control computer, the relay block, the junction box, and the meter unit are sequentially aligned substantially along the longitudinal centerline.

* * * * *